(12) United States Patent
Morar et al.

(10) Patent No.: US 6,678,822 B1
(45) Date of Patent: Jan. 13, 2004

(54) METHOD AND APPARATUS FOR SECURELY TRANSPORTING AN INFORMATION CONTAINER FROM A TRUSTED ENVIRONMENT TO AN UNRESTRICTED ENVIRONMENT

(75) Inventors: John Frederick Morar, Mahopac, NY (US); David Michael Chess, Mohegan Lake, NY (US); Jeffrey Owen Kephart, Cortlandt Manor, NY (US); Morton Gregory Swimmer, Chappaqua, NY (US); Steve Richard White, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/937,864

(22) Filed: Sep. 25, 1997

(51) Int. Cl.⁷ .................................. H04L 9/00
(52) U.S. Cl. ................ 713/182; 713/188; 713/153; 713/154; 713/160; 713/161; 713/162; 713/200; 713/201; 705/26; 705/27; 705/29; 705/41; 714/38
(58) Field of Search ............................... 713/200–201, 713/188, 153–154, 160, 162, 182; 705/26, 27, 29, 41; 380/4; 714/38

(56) References Cited

U.S. PATENT DOCUMENTS

| | | | |
|---|---|---|---|
| 4,916,738 A | 4/1990 | Chandra et al. ............... 380/25 |
| 5,126,728 A | * 6/1992 | Hall ........................... 340/825.3 |
| 5,440,723 A | 8/1995 | Arnold et al. ......... 395/183.09 |
| 5,452,442 A | 9/1995 | Kephart .................. 395/183.14 |
| 5,485,575 A | 1/1996 | Chess et al. ............ 395/183.14 |
| 5,572,590 A | 11/1996 | Chess ............................. 380/4 |
| 5,613,002 A | 3/1997 | Kephart et al. ................. 380/4 |
| 5,701,342 A | * 12/1997 | Anderson et al. ............... 380/4 |
| 5,832,212 A | * 11/1998 | Cragun et al. .............. 395/186 |
| 5,960,080 A | * 9/1999 | Fahlman et al. ................ 380/4 |

OTHER PUBLICATIONS

Author ?, Data Conversion, Extraction, and Migration, Database Buiyer's Guide and Client/Server Sourcebook, V9, n6 p. 48 Jun. 15, 1996, Abstract.*
William Stallings, Network and Internetwork kSecurity, Principles and practice, Prentice Hall, 1995.*

* cited by examiner

Primary Examiner—Gail Hayes
Assistant Examiner—James Seal
(74) Attorney, Agent, or Firm—Gail H. Zarick; Harrington & Smith, LLP

(57) ABSTRACT

A method for operating a data processing system of a type that includes a first data processing entity located within a trusted environment and a second data processing entity located within an untrusted environment. The method includes a first step, executed at the first data processing entity, of operating a first software agent for detecting a presence of an information container of interest and for producing a modified information container by automatically identifying and at least one of removing, masking, or replacing at least one predetermined type of restricted or private information in the information container. A second step of the method transports the modified information container from the first data processing entity to the second data processing entity for further processing. The further processing may entail an analysis of the modified information container to locate and/or identify an undesirable software entity, such as a computer virus.

43 Claims, 3 Drawing Sheets

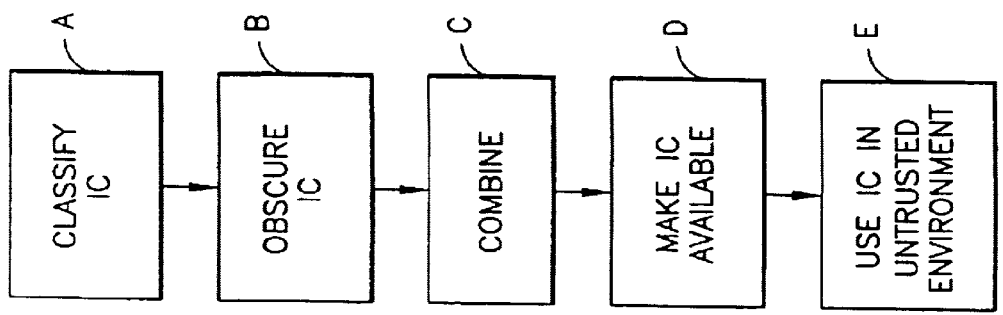
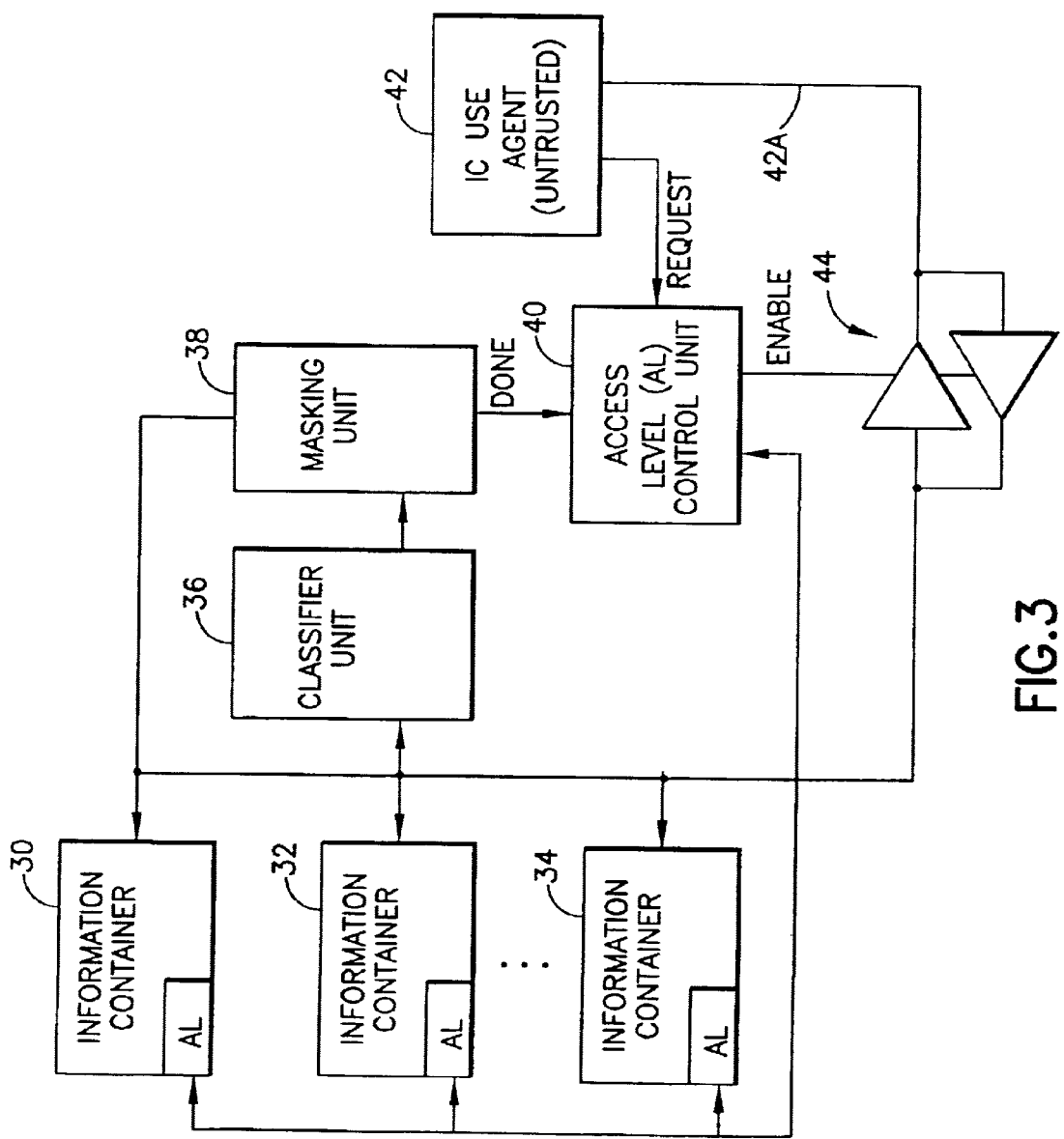

METHOD AND APPARATUS FOR SECURELY TRANSPORTING AN INFORMATION CONTAINER FROM A TRUSTED ENVIRONMENT TO AN UNRESTRICTED ENVIRONMENT

FIELD OF THE INVENTION

This invention relates generally to data processing systems and networks and, in particular, to those systems that enable the simultaneous existence of different sites or environments in which access to information may be restricted to one or several of the sites or environments.

BACKGROUND OF THE INVENTION

Many current document handling systems such as word processors and spread sheet programs are capable of including an active program logic portion along with data and/or text in a single file. Such a file is capable of being exchanged between data processing systems or between environments located on a single system. Such a file is representative of a class of objects used for exchanging code and/or data between distinct systems or environments. Such objects are referred to herein as information containers.

There are a number of software tools that are currently available for searching files for content with specific characteristics (e.g., unwanted data or active program content). Examples of such tools include anti-virus programs, string matching programs, and a variety of data mining programs.

A problem is created if a particular software tool is not available or cannot be run at a first data processing environment where the use of the tool is desired. In this case it is typically necessary to make the information container available at a second environment where the tool is available. However, the second data processing environment may be considered, relative to the first, originating data processing environment, as an "untrusted" environment. As such, an operator at the first data processing environment may be reluctant or unwilling to expose an information container of interest to the second data processing environment, as the information container of interest may contain restricted information, considered herein to be any information that is deemed to be sensitive, confidential, secret and/or proprietary, or any other information deemed as restricted to the first data processing environment. Restricted information may exist in the information container within data and/or program modules.

Even if the operator of the first data processing environment were to consider the second data processing environment as a trusted environment, it may still be necessary to transport the information container of interest through an untrusted medium, e.g., through a data communications network such as the Internet. Alternatively, both data processing environments may exist on the same logical or physical data processing unit. In such cases it may be possible to expose the information container of interest to the second data processing environment through a means which does not require transport. One example of such a means is to change the access permission associated with the information container existing in the first data processing environment in order to allow the second data processing environment to directly access the information container of interest.

OBJECTS AND ADVANTAGES OF THE INVENTION

It is a first object and advantage of this invention to provide a method and apparatus for securely exposing information from a first data processing environment to a second data processing environment so as to overcome the foregoing and other problems.

It is a second object and advantage of this invention to provide a method and apparatus for securely exposing information from a first data processing environment to a second data processing environment by first automatically identifying that information which causes the entire information container to be deemed as containing restricted information.

It is a third object and advantage of this invention to provide a method and apparatus for securely exposing information from a first data processing environment to a second data processing environment by first automatically identifying that information which causes the entire information container to be deemed as containing restricted information, and then automatically creating a new or modified version of the initial information container which contains none of the automatically identified information.

It is a fourth object and advantage of this invention to provide a method and apparatus for securely exposing information from a first data processing environment to a second data processing environment by first automatically identifying that information which causes the entire information container to be deemed as containing restricted information, and then automatically creating a new or modified version of the initial information container which contains a replacement for the automatically identified information such that the entire modified or created information container is not deemed as containing restricted information.

SUMMARY OF THE INVENTION

The foregoing and other problems are overcome and the objects and advantages are realized by methods and apparatus in accordance with embodiments of this invention.

In a first aspect this invention teaches a method for operating a data processing system of a type that includes a first data processing environment located within a trusted environment and a second data processing environment located within, or that is accessible through, an untrusted environment. A trusted environment can be comprised of one or more distinct environments which are all trusted. The method includes a first step, executed at the first data processing environment, of operating a first software agent for detecting a presence of an information container with characteristics that make it desirable for the information container to be used in the untrusted environment. A second step of the method analyzes the identified information container in order to identify the presence and location(s) of at least one predetermined type of restricted information. A third step of the method modifies the information container or creates a new information container in which all information identified as restricted is obscured. In a fourth step some or no unrestricted information (preserved in its original or an equivalent form) and/or some obscured information is made available to the untrusted environment for use.

In a further aspect this invention teaches a method for securely exposing an information container of interest from a first data processing environment to a second data processing environment, and includes computer executed steps of (a) identifying the presence and location of all occurrences of at least one predetermined type of restricted information within the information container of interest, (b) obscuring the restricted information using a process which has the property of converting restricted information to a form that would not be identified as restricted by the criteria used in step (a), where obscuring process may include at least one of removal, replacement, encryption, translation, modification and a structured substitution of the restricted information. This method further includes the steps of: (c) collecting some or none of the unrestricted information in its original or an equivalent form with some or none of the obscured information, and (d) making the collected information separately or jointly available to the second data processing environment without exposing any of the restricted information to the second data processing environment. The method may further include the steps of: (e) processing the supplied information at the second data processing environment and (f) performing actions based on the processing results.

The processing performed at the second data processing environment can utilize the supplied information in any manner available at the second data processing environment, such as detecting the presence of an undesirable software or data entity, identifying an undesirable software or data entity, detecting the presence of specific values, types, or patterns in data which has not been obscured, or removing an undesirable software or data entity from the supplied information. In some cases, processing may include a step of sending resulting information to the first data processing environment or to other data processing environments. Processing may also request additional information one or more times from the first data processing environment, or from other data processing environments, in order to complete the processing at the second data processing environment.

BRIEF DESCRIPTION OF THE DRAWINGS

The above set forth and other features of the invention are made more apparent in the ensuing Detailed Description of the Invention when read in conjunction with the attached Drawings, wherein:

FIG. 3 is a block diagram showing an embodiment of this invention wherein the trusted and untrusted environments coexist within a single data processing environment, machine or site; and FIG. 4 is logic flow diagram of a method in accordance with this invention.

DETAILED DESCRIPTION OF THE INVENTION

Figure 1:
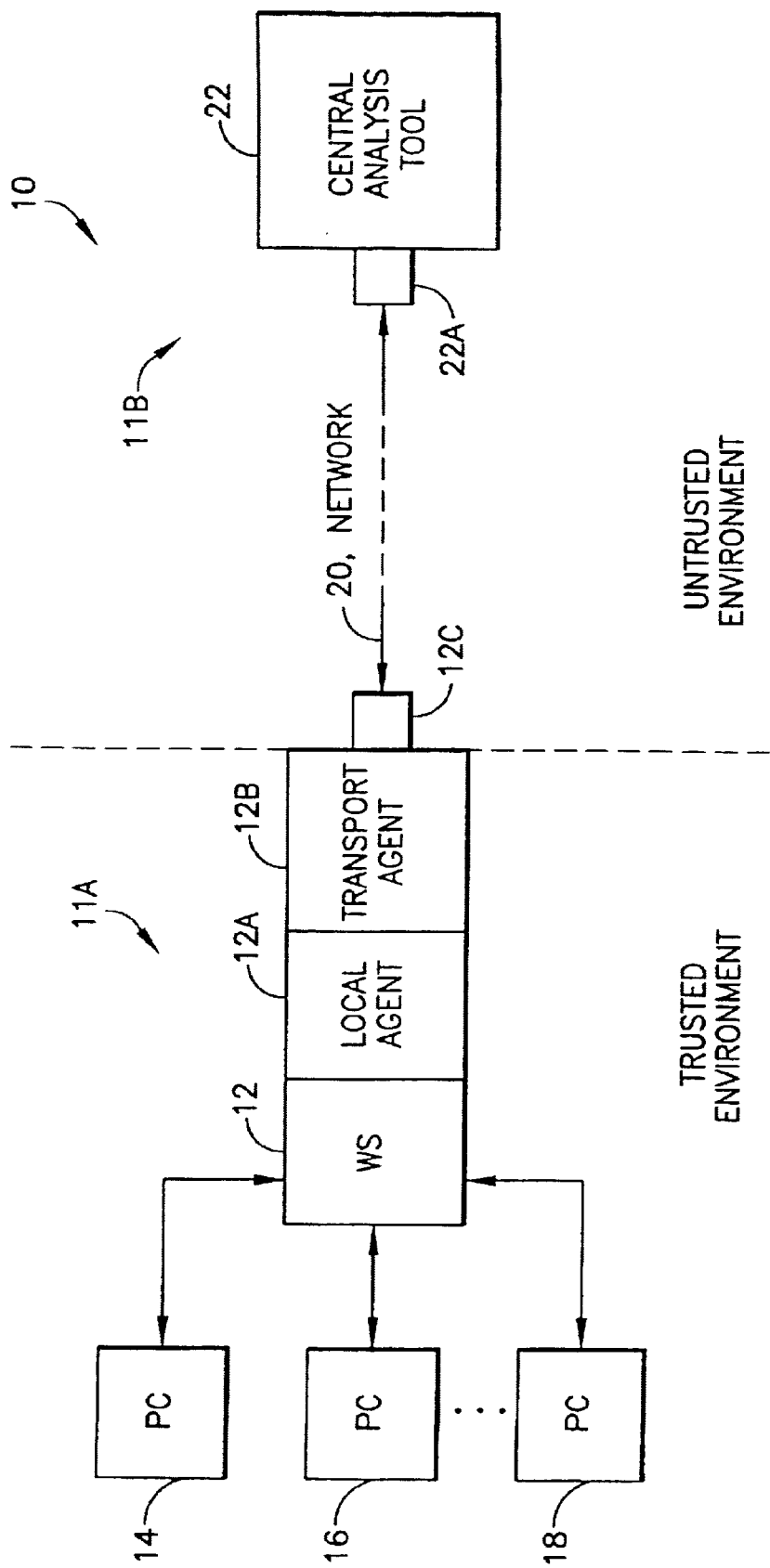
FIG. 1 is a block diagram showing a first data processing system that resides in a trusted environment, a second data processing system that resides in an untrusted environment, and a transport medium, such as a data communications network, that connects the first and second data processing systems.

The disclosures of the following commonly assigned U.S. Patents are incorporated be reference herein in their entireties for teaching various undesirable software entity (e.g., computer virus) identification, extraction, and removal techniques, as well as terminal security techniques: U.S. Pat. No. 4,916,738, "Remote Access Terminal Security", to Chandra et al.; U.S. Pat. No. 5,440,723, "Automatic Immune System for Computers and Computer Networks", to Arnold et al.; U.S. Pat. No. 5,452,442, "Methods and Apparatus for Evaluating and Extracting Signatures of Computer Viruses and Other Undesirable Software Entities", to Kephart; U.S. Pat. No. 5,485,575, "Automatic Analysis of a Computer Virus Structure and Means of Attachment to its Hosts", to Chess et al.; U.S. Pat. No. 5,613,002, "Generic Disinfection of Programs Infected with a Computer Virus", to Kephart et al.; and U.S. Pat. No. 5,572,590, "Discrimination of Malicious Changes to Digital Information Using Multiple Signatures", to Chess.

By way of introduction, this invention relates to techniques for obscuring selected information within a generalized information container (documents, programs, databases, structures held in memory, streaming packets, etc.) in a way that leaves the results of some uses of the information container substantially unchanged. In the preferred use of this invention an obscured information container is generated within the confines of a trusted environment. The obscured information container is then made available for use outside the trusted environment. In the preferred use of this invention it is a goal to maximize the amount of the information available to a broader audience without divulging privileged information outside the trusted environment.

Referring to FIG. 4, this invention operates in accordance with the following steps.

At Step A a software agent running in the trusted environment classifies the information in an information container into one of private or otherwise restricted information and public information. At Step B the same or another software agent partially or completely obscures the private information. At Step C the same or another software agent creates an obscured information container that combines the obscured private and public information. At Step D the obscured information container is made available in a public or untrusted environment. At Step E the obscured information container is used for some purpose in the public or untrusted environment.

As used herein, the following terms are intended to have certain meanings.

Classification: A classifier software agent is applied to the initial information container in order to separate its information into two or more privacy classes. While performing this step entirely within the confines of the trusted environment prevents the spread of possibly private information outside of the trusted environment, classification may be performed using any suitable technique, and in any environment, that respects the privacy of the information being classified.

Obscuring: After classification one or more obscuring algorithms are applied to the contents of one or more of the privacy classes in order to partially or completely obscure the contents of the privacy class. Partially obscured information retains some of the characteristics of the original information while substantially removing the private aspects of the information. Obscuring algorithms can employ a variety of techniques that include, but are not limited to, removal, replacement, encryption, translation, modification and structured substitution for the private information. Structured substitution is defined herein to encompass a process of substituting restricted information with an equivalent class of information that is not restricted. For example, each word in a restricted document could be replaced with a different word that is the same part of speech (i.e., verbs are replaced by verbs). Performing this step entirely within the confines of the trusted environment prevents the spread of possibly private information outside of the trusted environment, however, desired obscuring algorithms may be performed using any suitable technique, and in any environment, that respects the privacy of the information being obscured. The obscuring algorithm(s) produce one or more obscured information containers. Each obscured information container thus produced has a potential audience, based on the specific obscuring algorithms applied to each privacy class.

Broadening Availability: Any audience specified in the output of the obscuring stage can receive the associated obscured information container. Availability may be achieved via transport over a medium such as the Internet or a private network. If the transport involves exposure to an environment or audience not specified in the output of the obscuring stage, then encryption can be employed during transport. Alternatively, availability may be broadened via other means such as by changing the security classification or access control list of an already constructed obscured container thereby making it available to itinerant agents running on the same physical or logical execution unit (see FIG. 3).

Use: The use of an obscured information container is defined herein as any technique for extracting information that existed in the original information container. Information contained in the obscured information container may be intrinsically valuable in that it may be independently verified. Other information extracted from the information container may only be valuable if its authenticity as originating from the initial information container can be verified. Information that is intrinsically valuable may be validated without additional information concerning how the initial information container was obscured. For example, the prime factorization of a large number may be valuable since it can be readily confirmed but may be difficult to derive. Another example is a technique for preparing a food or a chemical substance, since the food or chemical substance can be prepared according to the technique to test the results.

Information found in the obscured information container, which cannot be independently verified, requires either access to the original information container, or may be verifiable with access to all or part of its associated obscuring and or classification algorithms. For example, assume that a particular audience has knowledge that a rule was applied that replaces each proper name with a coded sequence appearing nowhere else in the obscured information container except as a replacement for that proper name. Furthermore, assume that this procedure was followed for all proper names appearing in the information container and no other procedures were employed. Knowing this obscuring rule allows the audience to ascertain how many distinct proper names appear in the original document by counting occurrences of the coded sequence. Without some knowledge of the obscuring rules it is not generally possible to ascertain how many proper names were contained in an unobscured information container. Uses of an obscured container which are enhanced by access to all or some of the algorithms used for classification and obscuring include data mining, data filtering, computer virus detection, data routing and data classification.

Techniques for ascertaining what information can be removed from an information container are based on the following steps.

A) Decompose the information container, such as a document, into its constituent components based on the document structure. For example, Microsoft Word documents (files) have an internal structure that allows the automatic decomposition of the file into text and active program content (macros).

B) Run a filter on each constituent component to identify known private or restricted information. For example, when filtering text the names of confidential projects, names of individuals, and special numbers such as account numbers can be identified for removal from the document.

C) In the case of active program content, predefined macros which are confidential can be identified for removal using techniques such as check-sums.

Having performed the foregoing steps, i.e., identifying the document type and decomposing the document into its constituent components based on knowledge of the internal structure of the document type, removal can be effected by removing or obscuring the components not to be transmitted and then reconstituting the document from the resulting components based on knowledge of the initial document type.

Techniques for simulating the presence of removed content can include either of the following.

A) Decompose the document into its constituent components and replace unneeded components with random objects of the same class. For instance, to obscure the text of a document without fundamentally changing its nature, decompose the text into parts of speech, i.e., nouns, verbs, adjectives, numbers etc. Replace each of the parts of speech, e.g., nouns, with a random noun taken from a noun dictionary. Similarly, replace the verbs, adjectives etc. with random instances taken from a dictionary of the appropriate class of objects.

B) If predefined macros are deemed to be restricted information not to be disclosed outside of the trusted environment, the invention provides a substitute macro which provides the same class of functions (for example, the same input and output capabilities) but without the confidential information.

Reference is now made to FIG. 1 for illustrating an exemplary environment 10 within which the methods and apparatus of this invention can be employed. A first data processing environment or system 11A is shown to include a workstation (WS) 12 coupled to a plurality of personal computers (PCs) 14–18 in a star configuration. This architecture is exemplary, as the workstation 12 could instead be a stand-alone PC, WS, minicomputer, mainframe computer, or supercomputer. In like manner one or more of the PCs 14–18 could be instead a workstation or any other type of data processing system. Other local area network configurations could also be employed, such as token ring configuration. The WS 12 may include a so-called "firewall" for isolating the data processing system 11A from the external environment. The WS 12 could also include a proxy server function, whereby network requests made by the PCs 14–18 are filtered, and wherein accessed data, such as World Wide Web (WWW) pages, are cached for use by any of the PCs 14–18.

The data processing system 11A is considered to be contained within a trusted environment, relative to untrusted environments containing external data processing systems (each of which may also be considered locally to be a trusted environment). One such other data processing environment or system is shown as the system 11B. By example, the data processing system 11A could be resident within a trusted environment at a corporation, a university, a government agency, or any other location, and the data processing system 11B may reside in an untrusted environment at another corporation, university, or government agency.

The WS 12 includes a local agent 12A that functions, in a presently preferred embodiment of this invention, as a software agent or tool capable of determining an identity of an information container that is to be provided to the untrusted environment. In the ensuing description the identified information container is referred to as a "suspect" information container, implying that the information container exhibits some behavior or characteristic that may indicate that the information container is defective or possibly infected with an undesirable software or data entity.

Continuing with the description of FIG. 1, the software agent or tool is capable of determining an identity of a file or program that is being executed, or may be executed, or was executed, by the WS 12 and/or one of the PCs 14–18. By example, the local agent 12A can include computer virus detection software such as that described in the above referenced U.S. Pat. No. 5,440,723, "Automatic Immune System for Computers and Computer Networks", to Arnold et al. and U.S. Pat. No. 5,452,442, "Methods and Apparatus for Evaluating and Extracting Signatures of Computer Viruses and Other Undesirable Software Entities", to Kephart.

The local agent 12A may not, however, be implemented so as to be able to provide a detailed analysis of the suspect information container, or to provide a technique for removing an undesired software or data entity from the suspect information container, or to otherwise repair a defective or damaged suspect information container.

As such, the WS 12 also includes a transport agent 12B connected to a communications port 12C which in turn is connected to a communications network 20. The transport agent 12B can be any suitable data communications interface software, such as software operable for interfacing to the Internet.

The second data processing system 11B is comprised of a central analysis tool 22, and is connected to the network 20 through a communications port 22A. The central analysis tool 22 is comprised of software that operates autonomously or in cooperation with one or more human experts to evaluate, by example, files and programs that are suspected of being defective (e.g., those suspected of containing a software bug), or those that are suspected of being infected by an undesirable software or data entity.

In the former case the central analysis tool 22 may be operational for locating a software bug in executable code, and for deriving a "patch" to correct the software bug. In the latter case the central analysis tool 22 may be operational for determining the identity of a known or an unknown type of undesirable software or data entity, for extracting from the entity a "signature" or the like for identifying future instances of a previously unknown undesirable software entity, and for providing instructions for removing or otherwise dealing with an identified undesirable software or data entity. For example, the instructions can specify a technique to modify the suspect information container to reduce or eliminate the effect of a computer virus, such as by erasing the suspect information container, encrypting the file to restrict access to the file, moving the file to restrict access to the file, remove virus contaminated components, remove the virus, or otherwise modify the information container. Not all of these functions need be present in the central analysis tool 22. In response to the instructions the data processing system 11A takes the specified corrective action.

Figure 2:
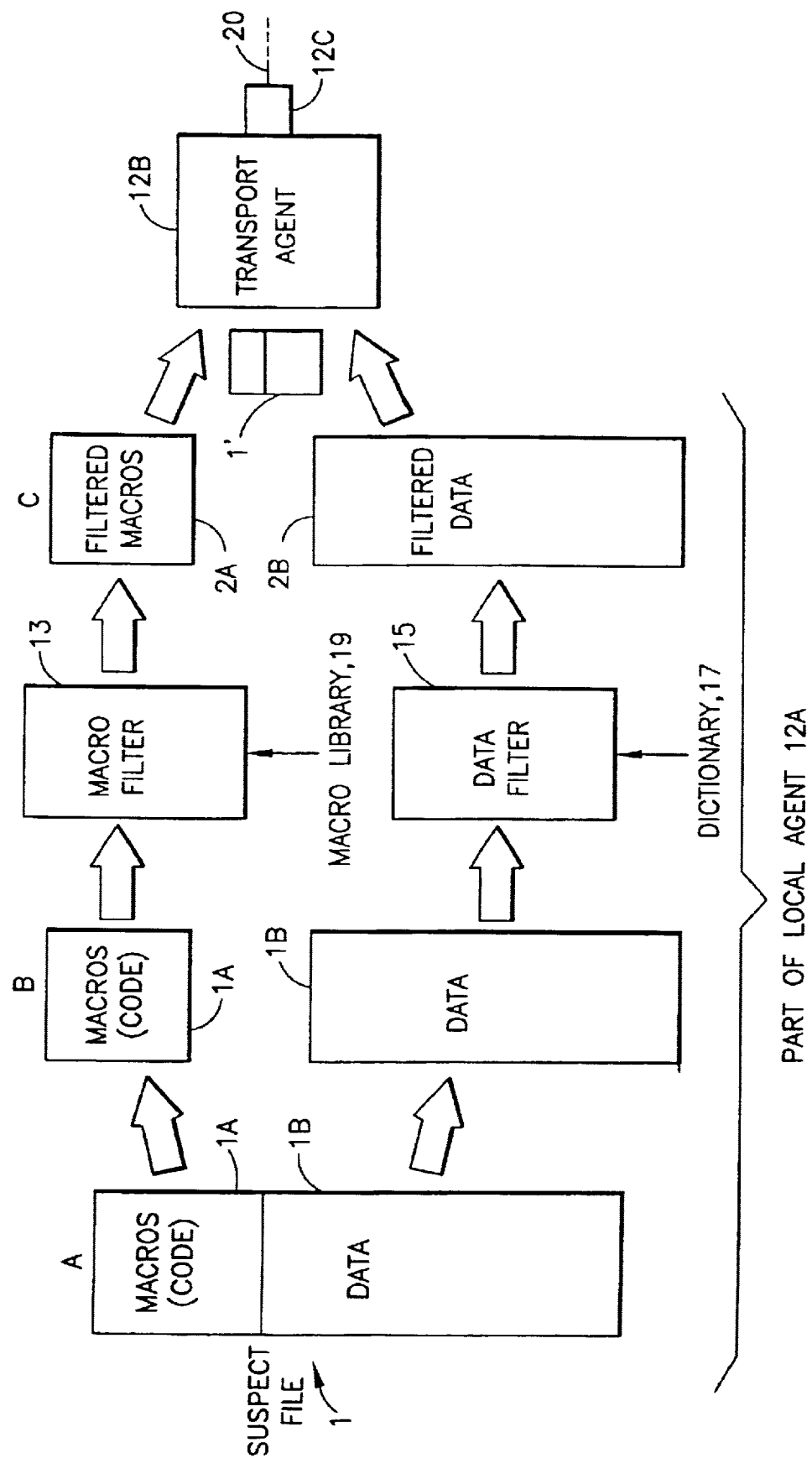
FIG. 2 is diagram that illustrates an operation of a local agent of the first data processing system of FIG. 1, and its connection to a transport agent also shown in FIG. 1.

Reference is now also made to FIG. 2 for illustrating an exemplary operation of the local agent 12A of FIG. 1.

Prior to Step A it is assumed that the local agent 12A has detected a possibility that a certain information container is infected by an undesirable software entity, hereinafter referred to for convenience as a computer virus. The certain information container can be referred to as the suspect information container 1. The detection could be based on, by example, an abnormal termination by or during the use of the suspect information container 1, or by a change in the checksum of the suspect information container 1. In an alternative embodiment the local agent 12A may simply periodically identify an information container for computer virus analysis or some other processing based on some predetermined schedule, or based on some triggering event. It may even be desirable to identify all accessible information containers.

The intended result of identifying the suspect information container 1 is to have the central analysis tool 22 perform a desired type of analysis on the suspect information container, and to also typically perform or specify some type of corrective or remedial action if the file is found to be infected with a computer virus. The remedial action could entail, by example, informing the local agent 12A of the identity of the computer virus, or informing the local agent 12A of how to remove the computer virus. The remedial action could also include providing the local agent 12A with an identifying signature of a previously unknown computer virus that is extracted by the central analysis tool 22, such that the local agent 12A is enabled to recognize a future occurrence of the previously unknown type of computer virus.

The central analysis tool 22 may also request additional information from the agent 12A running in the trusted environment. In this case the central analysis tool 22 may have to provide the local agent 12A in the trusted environment with some type of certificate which can be interpreted in the trusted environment as an indication of additional access authority for the central analysis tool 22, or as a commitment to pay or exchange some value for additional information.

In any event, the problem that is presented is in how to provide a copy or sample of the suspect information container 1 from the trusted environment to the untrusted environment for further analysis, without compromising any restricted information such as data or programs (e.g., macros or sub-routines) that may be embodied in the suspect information container 1.

This problem is solved at Steps B–C by first, optionally, making a working copy of the suspect information container 1, and by then segregating, at Step B, the working copy (if made) of the suspect information container 1 into its constituent functional components, such as an active program or macros section 1A and a text or data portion 1B. By example, the suspect information container 1 may represent a document created by a word processor, or may represent a spread sheet created by a spread sheet program. The segregation of the suspect information container 1 into its constituent functional components is based on, for a file, a knowledge of the file type, which can be obtained from the file's extension, and/or from descriptive information contained within the file.

Each constituent suspect information container component is then run through an associated filter, shown as a macros filter 13 and data filter 15, to automatically identify and delete, mask, or substitute restricted information. By example, and in a preferred embodiment of this invention, the suspect information container filtering or modifying step includes steps of substituting an occurrence of a deleted predetermined type of information content with another example of the predetermined type of content, such as by selecting the another example from a set of instances of the predetermined type of content. The predetermined type of content can be, by example, comprised of parts of speech (e.g., nouns, verbs, adjectives), numbers (e.g., telephone numbers, account numbers, social security numbers), date information, time of day information, and/or proper nouns and names (e.g., names of people, places, and/or organizations). In these various cases the another example of the predetermined type of content can be selected randomly or pseudorandomly from a set of instances of the predetermined type of content. For example, each noun can be replaced with another noun that is selected randomly from a dictionary 17 of nouns. Further by example, the data filter 15 may also or instead look for all occurrences of a numeric string having the format "XXX-XX-XXXX", which is assumed to represent, by example, a social security number or a brokerage account number, and then substitute for each numeric digit a randomly selected digit. For a case where the predetermined type of content includes executable software modules, such as proprietary macros or sub-routines, the modifying step may include a step of substituting an occurrence of a deleted macro, which may be first identified for deletion based on, by example, a predetermined checksum, with another macro selected from a macro library 19. The selected macro is preferably one that is functionally similar to the deleted macro. For example, the selected macro may have at least the same or a similar input/output interface specification as the original macro (e.g., the selected macro is invoked using the same number of variables which are declared to be the same type as input variables of the removed macro). The end result of the operation of the filters 13 and 15 is the generation, at Step C, of a filtered macros portion 2A and a filtered data portion 2B which have each been stripped or scrubbed, ideally, of all information that is not desired to be made available outside of the trusted environment.

In other embodiments of this invention the data and/or macros identified by the filters 13 and 15 may be simply deleted, or they may be replaced with some predetermined default information. By example, any numbers appearing in the data portion 1B could be deleted. Alternatively, any numbers appearing in the data portion 1B could be replaced with null characters (e.g., whitespace), or replaced with some predetermined number (e.g., zero). In both of these cases the original information is effectively masked.

Also by example, certain data and macros can be effectively compressed and masked, such as by replacing all multi-digit numbers (e.g., telephone numbers and social security numbers) with a single digit number. Further by example, and for a case where it is not desired or required to maintain an equivalent functionality with replacement macros, any proprietary macros may be replaced with a default macro that contains only one or a few instructions, such as NOP instructions. The use of such selective deletion and/or compression results in a smaller filtered file, thus enabling efficiencies to be gained during transport and also during processing by the central analysis tool 22.

The filtered macros portion 2A and the filtered data portion 2B are then provided, either separately or first recombined into a reconstituted filtered suspect information container 1', to the transport agent 12B for transmission to the central analysis tool 22 via the communications port 12C and the network 20. The transmitted information may be encrypted and/or compressed before transmission, using any suitable encryption/decompression algorithms, and then subsequently decrypted/decompressed by the central analysis tool 22 after reception. In other embodiments of this invention the filtered macros portion 2A and the filtered data portion 2B can be provided to the central analysis tool 22 by first recording them on a removable data storage medium, such as floppy disk or a tape, and the storage medium is then physically conveyed to the central analysis tool 22. In general, any suitable technique can be employed for making the suspect obscured information container available to the central analysis tool 22.

Upon receipt of the modified suspect information container the central analysis tool 22 performs desired types of processing on the filtered data and macros, such as computer virus identification and extraction. The central analysis tool 22 then sends a result of the processing back to the first data processing environment as described above. The result could be sent back through the communication network 20, through another communication network, or by using a removable data storage medium, such as floppy disk or tape.

The selective removal and/or replacement of file data has a number of advantages. First, the information that is removed, masked or substituted for is not subject to being intentionally or accidentally disclosed during transport to, or while residing in, the untrusted environment. Second, the selective removal and/or compression of the file data and/or program elements, as described above, can result in a smaller and more efficiently transported and processed filtered file. This in turn can enable a faster analysis of the filtered file by the central analysis tool 22.

In the practice of this invention it is generally desirable that the automatic deletion and possible masking and/or substitution of file information, before the modified suspect information container is made available to the central analysis tool 22, should result in the analysis procedure outputting a result that is substantially unchanged from one that would be achieved by analyzing the original, unfiltered suspect information container 1.

The following is a further example of the teaching of this invention. A "sanitation" phase is implemented in accordance with this invention entirely within the trusted environment. The sanitation phase employs a heuristic virus detection component (HVDC) that is installed on a personal computer (PC1) at XYZ Corp. The HVDC continuously monitors PC1. At some point in time the HVDC defects virus-like behavior on PC1 and associates it with a specific spreadsheet. The HVDC makes a copy of the suspect spreadsheet document and names the copy SS1. The HVDC then sanitizes SS1 by removing all text from SS1, leaving only the macros in SS1. The sanitized document is named SD1. The HVDC then submits SD1 for transport to the analysis tool 22.

The sanitation phase is followed by a transport phase, which may take place within a trusted, or an untrusted environment. SD1 is first transported to the analysis tool 22. Transportation can be accomplished using any method that leaves the contents of SD1 unchanged. In particular, transportation could be accomplished by any combination of the following mechanisms: (a) transmission over a trusted or untrusted network such as the Internet; (b) transmission over a public or private phone connection; or (c) transportation by moving physical media such as a diskette.

The transport phase is followed by an analysis phase which may take place in the trusted or the untrusted environment. In the analysis phase SD1 is analyzed by the analysis tool 22. If the macros which it contains are found to be viral then a set of prescriptions for dealing with the effect of the virus are compiled. Prescriptions may be generated automatically by applying a collection of algorithms. Individuals examining SD1 may also generate prescriptions. Possible prescriptions for dealing with the virus may include: (a) methods of detecting the virus in the original and similarly infected files; (b) methods of removing the virus from the original and similarly infected files;

and (c) methods of modifying the file with the intent of reducing the effect of the virus, as described above.

The analysis phase is followed by a second transport phase which may take place in the trusted or the untrusted environment. In the second transport phase any prescription (s) are transported back to the HVDC. This can be accomplished using any method that leaves the contents of prescription(s) unchanged. In particular, transportation could be accomplished by any combination of the mechanisms used during the first transport phase described above.

A final phase implements the prescription(s) in the trusted environment by applying the prescription(s) to the information container of interest.

This invention thus provides a method that is performed in a trusted environment for automatically classifying the information in a container into one of two classes, a private class and a public class. The classification can be applied to documents (such as word processor or spreadsheet documents) in which a specific collection of word sequences, of character sequences, or patterns of character sequences are considered private. Patterns can be formulated using standard pattern matching techniques. The classification can also be applied to documents (such as word processor or spreadsheet documents) in which data could be considered private and macros could be considered public, or where a subset of the macros may be identified as private. In a further case any macro that is similar to (e.g., produces the same result) a predefined macro in the subset of macros may be deemed to be private. Methods are used based on an automated analysis of information which can identify classes of information, such as telephone numbers, social security numbers, part numbers, dates, times, weight, height, color, age, value, etc. can all be used. Also, a method may be used, such as one described in U.S. Pat. No. 5,613,002, "Generic Disinfection of Programs Infected with a Computer Virus", to classify the contents of an information container as viral and non-viral.

This invention thus further provides a method performed in a trusted environment for automatically obscuring information contained in the private class so that the obscured information can be classified as not being private, using the same criteria as discussed above. This method can proceed by the steps of: removing the private information; translating the private information; replacing the private information with fixed sequences of machine readable information; replacing the private information with random machine readable information; replacing the private information with a combination of fixed and random sequences of machine readable information; characterizing the private information and replacing it with a similar class of information; and/or replacing private information with a descriptive tag which describes the class of information (e.g., replace "John" with <4 character proper name> or <4 character masculine name>. These techniques can be implemented by: replacing character based information with random characters; replacing machine readable numeric information with random machine readable numeric information; replacing machine readable numeric information with random machine readable numeric information formatted to the same data type; replacing alpha sequences with words chosen randomly from a dictionary; and/or ascertaining a national language by analyzing the alpha sequences and replacing alpha sequences with words coming from a dictionary of the same national language. It is also within the scope of the teaching of this invention to replace the private information with an encrypted form of the private information.

This invention further provides a method for combining the obscured private information and the not private or public information into an obscured information container which can be classified as not private using the same criteria as described above. This may be accomplished by combining the public information and the obscured private information into an information container with the same format as the original information container, or by combining the public and private information into a custom information container.

This invention further provides a method for making the obscured information container available outside of the trusted environment. This can be accomplished by transporting the information container, possibly in an encrypted form or a partially encrypted form, by physical media or by electronic transfer to another site, or to another part of the same site, or to a logically distinct part of the same logical computing unit. The availability of the obscured information container may be broadened through other means, such as by changing the security classification or access control list of an already constructed obscured container. Any of the foregoing techniques can be used to make the obscured information container available to agents running on the same physical or logical execution unit.

The obscured information container can be used or further processed to accomplish, by example, data mining, data classification, data filtering, computer virus detection, and/or data routing. For example, and for a case where a portion of what is made available is encrypted, the routing of the obscured information container, or a classification of the obscured information container, can be made on that portion that is not encrypted, that is, on the public portion.

As a further example of the utility of this invention, consider an application in which two individuals share an encryption key that is unknown to anyone except the two individuals. Assume that the individuals obscure, as described above, their E-mail before transmitting it over the Internet such that only private information is obscured. Assume further that they attach a file to their E-mail that contains an encrypted form of all the private information that was obscured. Also assume that their E-mailed is scanned for viruses in an untrusted mail server, and that the mail server can modify their mail to remove viruses (which were not obscured in this example). When the mail arrives at the destination the attached file is unencrypted and the information in the file is unobscured. What has been described is thus a method for sending encrypted E-mail that allows for removing viruses in transit.

The ultimate use of the modified information container may imply that the using entity have knowledge of the rule or rules used in obscuring the information container. The rule or rules may be known a priori in both the trusted and the untrusted environments, or the rule or rules can be transported or otherwise made available with the modified information container. By example, assume that a software agent in the untrusted environment is to perform an analysis of the modified information container to detect all occurrences of feminine names. If the information container is obscured using a rule that all feminine names are replaced with a randomly selected feminine name, then the operation of the software agent should not be adversely impacted. However, if the rule used for obscuring is that all feminine names are replaced by a randomly selected feminine or masculine name, then the software agent should have knowledge of this rule in order not to reach an erroneous result by processing the modified information container.

While the invention has been particularly shown and described with respect to preferred embodiments thereof, it will be understood by those skilled in the art that changes in form and details may be made therein without departing from the scope and spirit of the invention.

What is claimed is:

1. A method performed in a first data processing environment for making information available to a second data processing environment, comprising the computer executed steps of:

classifying, in the first data processing environment, information in an information container into one of at least two classes, comprising a private class of information that is not to be divulged outside of the first data processing environment and a public class of information that can be divulged outside of the first data processing environment;

obscuring, in the first data processing environment, the information classified into the private class such that the obscured information would be classified as being within the public class; and combining the information in the public class with the obscured information to form an obscured information container;

the method further comprising steps of, making the obscured information container available outside of the first data processing environment; and using the obscured information container outside of the first data processing environment, and further comprising a step of making a result of the use of the obscured information container known in the first data processing environment.

2. A method as in claim 1, wherein the information that is classified is at least one of data or programs.

3. A method as in claim 2, wherein the data is comprised of at least one of words and numbers.

4. A method as in claim 1, wherein the step of obscuring operates to perform at least one of: removing private information; translating private information; replacing private information with fixed sequences of machine readable information; replacing private information with random machine readable information; replacing private information with a combination of fixed and random sequences of machine readable information; replacing private information with a similar class of information; and replacing private information with a descriptive tag which describes the class of information.

5. A method performed in a first data processing environment for making information available to a second data processing environment, comprising the computer executed steps of:

classifying, in the first data processing environment, information in an information container into one of at least two classes, comprising a private class of information that is not to be divulged outside of the first data processing environment and a public class of information that can be divulged outside of the first data processing environment;

obscuring, in the first data processing environment, the information classified into the private class such that the obscured information would be classified as being within the public class; and combining the information in the public class with the obscured information to form an obscured information container;

the method further comprising steps of, making the obscured information container available outside of the first data processing environment; and using the obscured information container outside of the first data processing environment;

wherein the step of obscuring operates to perform at least one of: removing private information; translating private information; replacing private information with fixed sequences of machine readable information; replacing private information with random machine readable information; replacing private information with a combination of fixed and random sequences of machine readable information; replacing private information with a similar class of information; and replacing private information with a descriptive tag which describes the class of information, wherein the step of replacing private information with a similar class of information includes at least one of: replacing character based information with random characters; replacing machine readable numeric information with random machine readable numeric information; replacing machine readable numeric information with random machine readable numeric information formatted to the same data type; replacing alpha sequences with words chosen randomly from a dictionary.

6. A method performed in a first data processing environment for making information available to a second data processing environment, comprising the computer executed steps of:

classifying, in the first data processing environment, information in an information container into one of at least two classes, comprising a private class of information that is not to be divulged outside of the first data processing environment and a public class of information that can be divulged outside of the first data processing environment;

obscuring, in the first data processing environment, the information classified into the private class such that the obscured information would be classified as being within the public class; and combining the information in the public class with the obscured information to form an obscured information container;

the method further comprising steps of, making the obscured information container available outside of the first data processing environment; and using the obscured information container outside of the first data processing environment;

wherein the step of obscuring operates to perform at least one of: removing private information; translating private information; replacing private information with fixed sequences of machine readable information; replacing private information with random machine readable information; replacing private information with a combination of fixed and random sequences of machine readable information; replacing private information with a similar class of information; and replacing private information with a descriptive tag which describes the class of information, wherein the step of replacing private information with a similar class of information includes ascertaining a national language by analyzing alpha sequences and replacing alpha sequences with words from a dictionary of the same national language.

7. A method as in claim 1, wherein the step of obscuring operates to replace private information with an encrypted form of the private information.

8. A method as in claim 1, wherein the step of combining combines the public information and the obscured information into an obscured information container having one of the same type or a different type of information container as the original information container.

9. A method as in claim 1, wherein the step of making the obscured information container available includes a step of transporting the obscured information container by physical media or by electronic transfer to another site, or to another part of the same site, or to a logically distinct part of a same logical computing unit.

10. A method for securely transporting an information container of interest from a first data processing environment to a second data processing environment, comprising the computer implemented steps of:
   automatically identifying, at the first data processing environment at least one predetermined type of information container content to be deleted, the predetermined type of information container content comprising private information that is not to be divulged outside of the first data processing environment;
   deleting the identified at least one predetermined type of information container content; and
   modifying the information container to simulate the presence of the deleted at least one predetermined type of information container content;
   the method further including a step of,
      transporting the modified information container from the first data processing environment to the second data processing environment, and further comprising steps of:
         processing the modified information container at the second data processing environment; and
         transporting a result of the processing from the second data processing environment to the first data processing environment.

11. A method for securely transporting an information container of interest from a first data processing environment to a second data processing environment, comprising the computer implemented steps of:
   automatically identifying, at the first data processing environment, at least one predetermined type of information container content to be deleted, the predetermined type of information container content comprising private information that is not to be divulged outside of the first data processing environment;
   deleting the identified at least one predetermined type of information container content; and
   modifying the information container to simulate the presence of the deleted at least one predetermined type of information container content;
   the method further including a step of,
      transporting the modified information container from the first data processing environment to the second data processing environment;
      and further comprising steps of
         processing the modified information container at the second data processing environment; and
         transporting a result of the processing from the second data processing environment to the first data processing environment,
   wherein the step of processing includes a step of executing a program for detecting a presence of an undesirable software or data entity in the modified information container.

12. A method for securely transporting an information container of interest from a first data processing environment to a second data processing environment, comprising the computer implemented steps of:
   automatically identifying, at the first data processing environment, at least one predetermined type of information container content to be deleted, the predetermined type of information container content comprising private information that is not to be divulged outside of the first data processing environment;
   deleting the identified at least one predetermined type of information container content; and
   modifying the information container to simulate the presence of the deleted at least one predetermined type of information container content;
   the method further including a step of,
      transporting the modified information container from the first data processing environment to the second data processing environment;
      and further comprising steps of
         processing the modified information container at the second data processing environment; and
         transporting a result of the processing from the second data processing environment to the first data processing environment,
   wherein the step of processing includes a step of executing a program for identifying an undesirable software or data entity in the modified information container.

13. A method for securely transporting an information container of interest from a first data processing environment to a second data processing environment, comprising the computer implemented steps of:
   automatically identifying, at the first data processing environment, at least one predetermined type of information container content to be deleted, the predetermined type of information container content comprising private information that is not to be divulged outside of the first data processing environment;
   deleting the identified at least one predetermined type of information container content; and
   modifying the information container to simulate the presence of the deleted at least one predetermined type of information container content;
   the method further including a step of,
      transporting the modified information container from the first data processing environment to the second data processing environment;
      and further comprising steps of
         processing the modified information container at the second data processing environment; and
         transporting a result of the processing from the second data processing environment to the first data processing environment,
   wherein the step of processing includes a step of executing a program for removing an undesirable software or data entity in the modified information container.

14. A method for securely transporting an information container of interest from a first data processing environment to a second data processing environment, comprising the computer implemented steps of:
   automatically identifying, at the first data processing environment, at least one predetermined type of information container content to be deleted, the predetermined type of information container content comprising private information that is not to be divulged outside of the first data processing environment;
   deleting the identified at least one predetermined type of information container content; and
   modifying the information container to simulate the presence of the deleted at least one predetermined type of information container content;
   the method further including a step of,
      transporting the modified information container from the first data processing environment to the second data processing environment;
      and further comprising steps of
         processing the modified information container at the second data processing environment; and transporting a result of the processing from the second data processing environment to the first data processing environment, wherein the step of processing includes a step of executing a program for modifying an undesirable software or data entity in the modified information container.

15. A method as in claim 12, wherein the step of transporting a result of the processing includes a step of sending information to the first data processing environment for use in detecting a future occurrence of the undesirable software or data entity.

16. A method as in claim 10, wherein the step of modifying includes a step of substituting an occurrence of a deleted predetermined type of content with another example of the predetermined type of content that comprises public information that can be divulged outside of the first data processing environment.

17. A method as in claim 16, wherein the another example is selected from a set of instances of the predetermined type of content that comprises the public information.

18. A method for securely transporting an information container of interest from a first data processing environment to a second data processing environment, comprising the computer implemented steps of:

automatically identifying, at the first data processing environment, at least one predetermined type of information container content to be deleted, the predetermined type of information container content comprising private information that is not to be divulged outside of the first data processing environment;

deleting the identified at least one predetermined type of information container content; and modifying the information container to simulate the presence of the deleted at least one predetermined type of information container content;

the method further including a step of, transporting the modified information container from the first data processing environment to the second data processing environment;

wherein the step of modifying includes a step of substituting an occurrence of a deleted predetermined type of content with another example of the predetermined type of content;

wherein the another example is selected from a set of instances of the predetermined type of content; and wherein the private information is comprised of parts of speech.

19. A method as in claim 10, wherein the private information is comprised of numbers.

20. A method as in claim 10, wherein the private information is comprised of at least one of date, time, height, weight, color, or age.

21. A method for securely transporting an information container of interest from a first data processing environment to a second data processing environment, comprising the computer implemented steps of:

automatically identifying, at the first data processing environment, at least one predetermined type of information container content to be deleted, the predetermined type of information container content comprising private information that is not to be divulged outside of the first data processing environment;

deleting the identified at least one predetermined type of information container content; and modifying the information container to simulate the presence of the deleted at least one predetermined type of information container content;

the method further including a step of, transporting the modified information container from the first data processing environment to the second data processing environment;

wherein the step of modifying includes a step of substituting an occurrence of a deleted predetermined type of content with another example of the predetermined type of content; and wherein the another example is selected randomly or pseudorandomly from a set of instances of the predetermined type of content that comprises public information that can be divulged outside of the first data processing environment.

22. A method for securely transporting an information container of interest from a first data processing environment to a second data processing environment, comprising the computer implemented steps of:

automatically identifying, at the first data processing environment, at least one predetermined type of information container content to be deleted, the predetermined type of information container content comprising private information that is not to be divulged outside of the first data processing environment;

deleting the identified at least one predetermined type of information container content; and modifying the information container to simulate the presence of the deleted at least one predetermined type of information container content, the method further including a step of, transporting the modified information container from the first data processing environment to the second data processing environment, wherein the predetermined type of content includes executable software modules, and wherein the step of modifying includes a step of substituting an occurrence of a deleted software module with another software module that is functionally similar to the deleted software module and that comprises public information that can be divulged outside of the first data processing environment.

23. A method for securely transporting an information container of interest from a first data processing environment to a second data processing environment, comprising the computer implemented steps of:

automatically identifying, at the first data processing environment, at least one predetermined type of information container content to be deleted, the predetermined type of information container content comprising private information that is not to be divulged outside of the first data processing environment;

deleting the identified at least one predetermined type of information container content; and modifying the information container to simulate the presence of the deleted at least one predetermined type of information container content, the method further including a step of, transporting the modified information container from the first data processing environment to the second data processing environment, wherein the predetermined type of content includes executable software modules, and wherein the step of modifying includes a step of substituting an occurrence of a deleted software module with another software module that has an input/output interface that is functionally similar to the deleted software module and that comprises public information that can be divulged outside of the first data processing environment.

24. A method as in claim 10, wherein the first and the second data processing environments are comprised of two spatially separated data processing entities.

25. A method as in claim 10, wherein the first and the second data processing environments are comprised of two data processing entities connected to a common communications network.

26. A method as in claim 10, wherein the first and the second data processing environments are comprised of two logically separated data processing entities within a single data processor unit.

27. A data processing system, comprising:
a first data processing entity located within a first data processing environment;
a second data processing entity located within a second data processing environment;
said first data processing entity comprising a first software agent for detecting a presence of an information container of interest and for automatically identifying a presence in the information container of at least one predetermined type of private information that is not to be divulged outside of the first data processing environment and for obscuring the identified at least one predetermined type of private information in the information container to produce a modified information container containing only public information that can be disclosed outside of the first data processing environment, said first data processing entity further comprising means for making the modified information container available to the second data processing entity for further processing;
wherein said second data processing entity includes a second software agent for processing the modified information container and for making a result of the processing available to the first data processing entity.

28. A data processing system as in claim 27, wherein the first and the second data processing entities are comprised of two spatially separated data processing entities.

29. A data processing system as in claim 27, wherein the first and the second data processing entities are comprised of two data processing entities connected to a common communications network.

30. A data processing system as in claim 27, wherein the first and the second data processing entities are comprised of two logically separated data processing entities within a single data processor unit.

31. A data processing system as in claim 27, wherein the at least one predetermined type of private information that is obscured is encrypted and made available for use an encrypted information.

32. A data processing system as in claim 31, wherein the encrypted information is made available within a second data processing environment.

33. A data processing system as in claim 31, wherein the modified information container is unobscured using the encrypted information.

34. A data processing system as in claim 31, wherein the modified information container is unobscured in the first data processing environment using the encrypted information.

35. A data processing system as in claim 27, wherein the modified information container is made available by routing the modified information container based on information that is not obscured.

36. A data processing system as in claim 31, wherein the modified information container is made available by routing the modified information container based on information that is not encrypted.

37. A data processing system, comprising:
a first data processing entity located within a first data processing environment;
a second data processing entity located within a second data processing environment;
said first data processing entity comprising a first software agent for detecting a presence of an information container of interest and for automatically identifying a presence in the information container of at least one predetermined type of private information that is not to be divulged outside of the first data processing environment and for obscuring the identified at least one predetermined type of private information in the information container to produce a modified information container, said first data processing entity further comprising means for making the modified information container available to the second data processing entity for further processing;
wherein the at least one predetermined type of private information that is obscured is encrypted and made available for use as encrypted information; and
wherein the modified information container is categorized based on information that is not encrypted.

38. A data processing system as in claim 27, wherein the information container is filtered to remove predetermined information.

39. A data processing system, comprising:
a first data processing entity located within a first data processing environment;
a second data processing entity located within a second data processing environment;
said first data processing entity comprising a first software agent for detecting a presence of an information container of interest and for automatically identifying a presence in the information container of at least one predetermined type of private information that is not to be divulged outside of the first data processing environment and for obscuring the identified at least one predetermined type of private information in the information container to produce a modified information container, said first data processing entity further comprising means for making the modified information container available to the second data processing entity for further processing;
wherein the at least one predetermined type of private information that is obscured is encrypted and made available for use as encrypted information; and
wherein the modified information container is further modified after being made available for use, with the further modification being made on a portion that is not encrypted.

40. A method as in claim 9, wherein the step of transporting the obscured information container transports the obscured information container in an encrypted form.

41. A method as in claim 1, wherein the at least one file is comprised of at least one of data, a program, a macro, a document, a spreadsheet and a database.

42. A method as in claim 10, wherein the at least one file is comprised of at least one of data, a program, a macro, a document, a spreadsheet and a database.

43. A data processing system as in claim 27, wherein said at least one file is comprised of at least one of data, a program, a macro, a document, a spreadsheet and a database.

* * * * *

UNITED STATES PATENT AND TRADEMARK OFFICE
CERTIFICATE OF CORRECTION

PATENT NO. : 6,678,822 B1
DATED : January 13, 2004
INVENTOR(S) : John Frederick Morar et al.

It is certified that error appears in the above-identified patent and that said Letters Patent is hereby corrected as shown below:

Title page,
Item [54], Title, please correct title as follows:
-- METHOD AND APPARATUS FOR SECURELY TRANSPORTING AN INFORMATION CONTAINER FROM A TRUSTED ENVIRONMENT TO AN UNTRUSTED ENVIRONMENT --.

Column 19,
Line 46, delete "an" and replace with -- as --.

Signed and Sealed this

Fifteenth Day of June, 2004

JON W. DUDAS
*Acting Director of the United States Patent and Trademark Office*